US008158183B2

(12) United States Patent
Roy et al.

(10) Patent No.: US 8,158,183 B2
(45) Date of Patent: Apr. 17, 2012

(54) UNSATURATED ACIDS FOR FADING PROTECTION OF COLORS DERIVED FROM NATURAL SOURCES USED IN BEVERAGE PRODUCTS

(75) Inventors: Glenn Roy, Beacon, NY (US); Stephen Letourneau, Cos Cob, CT (US); Cathy Culver, Valhalla, NY (US); John Behrens, Poughkeepsie, NY (US)

(73) Assignee: PepsiCo, Inc., Purchase, NY (US)

( * ) Notice: Subject to any disclaimer, the term of this patent is extended or adjusted under 35 U.S.C. 154(b) by 714 days.

(21) Appl. No.: 12/335,191

(22) Filed: Dec. 15, 2008

(65) Prior Publication Data

US 2010/0151084 A1 Jun. 17, 2010

(51) Int. Cl.
*A23L 2/00* (2006.01)
(52) U.S. Cl. ......................................... 426/590; 426/599
(58) Field of Classification Search .................. 426/590, 426/599
See application file for complete search history.

(56) References Cited

U.S. PATENT DOCUMENTS

| | | | |
|---|---|---|---|
| 4,497,835 A | 2/1985 | Winston |
| 4,622,227 A | 11/1986 | Saleeb et al. |
| 4,925,686 A | 5/1990 | Kastin |
| 5,358,675 A | 10/1994 | Campbell et al. |
| 5,670,344 A | 9/1997 | Mehansho et al. |
| 6,306,094 B1 | 10/2001 | Joseph |
| 6,361,818 B2 | 3/2002 | Biyani et al. |
| 6,491,947 B2 | 12/2002 | Moore et al. |
| 6,572,906 B1 | 6/2003 | Higashimura et al. |
| 6,607,761 B2 | 8/2003 | Henry et al. |
| 6,730,342 B2 | 5/2004 | Saito et al. |
| 7,094,434 B2 | 8/2006 | Gaonkar et al. |
| 7,138,079 B2 | 11/2006 | Pearce |
| 2003/0161933 A1 | 8/2003 | Anderson et al. |
| 2003/0236313 A1 | 12/2003 | Pearce |
| 2004/0091589 A1 | 5/2004 | Roy et al. |
| 2004/0096547 A1 | 5/2004 | Ferruzzi |
| 2004/0115307 A1 | 6/2004 | Boyd |
| 2004/0161496 A1 | 8/2004 | Bouman et al. |
| 2005/0106306 A1 | 5/2005 | Mennett et al. |
| 2005/0181101 A1 | 8/2005 | Harada et al. |
| 2006/0039972 A1 | 2/2006 | Aldritt et al. |
| 2006/0121158 A1 | 6/2006 | Ferruzzi et al. |
| 2008/0014315 A1 | 1/2008 | DeLease |
| 2008/0038408 A1 | 2/2008 | Hosoya et al. |

FOREIGN PATENT DOCUMENTS

| | | |
|---|---|---|
| JP | 2002338844 A | 11/2002 |
| JP | 2005192402 A | 7/2005 |
| WO | 02/087357 A1 | 11/2002 |

OTHER PUBLICATIONS

Peterson, Martin, S. et al. 1978. Encyclopedia of Food Science. The AVI Publishing Company, Inc., Westport, CT. p. 337.*

Igoe. R. S. 1989. Dictionary of Food Ingredients. Van Nostrand Reinhold, New York. p. 84, 136.*

Cash, J. N. et al. 1977. Journal of Food Science 42(2)543.*

Zapsalis, C. et al. Journal of Food Science 30(3)396.*

Mazza, G., Miniati, E., "Anthocyanins in Fruits, Vegetables and Grains", Boca Raton: CRC, p. 89—Cited in Prior et al., J. Agric. Food Chem. 46, 2686 (1998).

Brenneisen R., Steinegger, E. , "Quantitativer Vergleich der Polyphenole in Fruchten von *Vaccinium myrtillus* L. unterschiedlichen Reifegrades", Pharm. Acta Helv. 56, 180 (1991).

Brenneisen, R., Steinegger, E.,"Zur Analytik der Polyphenole der Fruchte von *Vaccinium myrtillus* L. (Ericaceae)," Pharm. Acta Helv. 56, 341 (1981).

Jaakola, L., Maatta, K., Pirttila, A.M., Torronen, R., Karenlampi, S., Hohtola, A., "Expression of Genes Involved in Anthocyanin Biosynthesis in Relation to Anthocyanin, Proanthocyanidin, and Flavonol Levels during Bilberry Fruit Development", Plant Physiology 130, 729 (2002).

Prior, R.L., Cao, G., Martin, A., Sofic, E., McEwen, J., O'Brien, C., Lischner, N., Elhenfeldt, M. Kalt, W., Krewer, G., Mainland, C.M., "Antioxidant Capacity as Influenced by Total Phenolic and anthocyanin Content, Maturity, and Variety of Vaccinium Species" ,J. Agric. Food Chem. 46, 2686 (1998).

Ohta, et al., "Effects of Organic Acids on Anthocyanin Pigment From Juice of Campbell Early Grapes," Journal of Japanese Society of Food Science and Technology, vol. 25, No. 2, 1978, pp. 78-82.

Kim, et al., "Characteristics and Stability of the Color of the Cranberry Solution," Journal of the Korean Society of Food Science and Nutrition, vol. 32, No. 6, 2003, pp. 806-811.

Chinnici, et al., "Optimization of the Determination of Organic Acids and Sugars in Fruit Juices by Ion-Exclusion Liquid Chromatography," Journal of Food Composition and Analysis, Academic Press, London, GB, vol. 18, No. 2-3, Mar. 1, 2005, pp. 121-130.

Verardo, et al., "New Procedures for Determination of Acids in Coffee Extracts, and Observations on the Development of Acidity Upon Ageing," Analytical and Bioanalytical Chemistry, vol. 374, No. 5, Oct. 10, 2002, pp. 879-885.

International Search Report in related International Patent Application No. PCT/US2009/065166 dated Apr. 9, 2010.

* cited by examiner

*Primary Examiner* — Carolyn Paden
(74) *Attorney, Agent, or Firm* — Banner & Witcoff, Ltd.

(57) ABSTRACT

A beverage product that includes water, a color derived from natural sources, and a compound in an effective amount to inhibit fading of the color derived from natural sources. The compound is an unsaturated acid, and may be selected from the group consisting of maleic acid, maleic anhydride, aconitic acid, mesaconic acid, itaconic acid, and/or fumaric acid. The incorporation of the compound can be particularly useful for inhibiting color fading of the beverage product under thermal stress. The colors derived from natural sources may be an anthocyanin, cyclohexene dione dimers and/or a color derived from the reaction of an iridoid and amino acids. For example, the colors may include purple sweet potato, black carrot, purple carrot, black currant, blueberry, *carthamus* yellow, and/or gardenia blue. The compound can be effective to prevent color fading even in the presence of ascorbic acid, which promotes the fading of colors derived from natural sources.

18 Claims, 5 Drawing Sheets

UNSATURATED ACIDS FOR FADING PROTECTION OF COLORS DERIVED FROM NATURAL SOURCES USED IN BEVERAGE PRODUCTS

FIELD OF THE INVENTION

This invention relates to beverages and other beverage products that include colors derived from natural sources, such as finished beverages, concentrates, syrups and the like. In particular, this invention relates to beverage products having formulations for preventing fading of colors derived from natural sources.

BACKGROUND

It has long been known to produce beverages of various formulations. Improved and new formulations are desirable to achieve desired nutritional characteristics, flavor, shelf life, and other objectives. For example, it would be desirable to prevent the fading of colors derived from natural sources in beverages that often occurs over time, particularly when the beverage is subjected to high temperatures during transport and storage. For example, following manufacture, beverage products are generally not refrigerated during distribution and may be subjected to temperatures of up to about 110 degrees Fahrenheit during transport. In addition, beverage products may be subjected to temperatures of up to about 90 degrees Fahrenheit for several weeks during storage prior to sale.

It is believed that reduction is primarily responsible for color instability or color fading. Reduction can be chemically-, light- or biologically induced by microbes or enzymes in a given beverage composition, though light is typically the predominant initiator. Secondary chemical reduction initiators may be present in certain beverages, such as ascorbic acid, and hydroxymethylfurfural (HMF formed in HFCS). Moreover, these initiators work with light to fade colors, thus the presence of an antioxidant, such as ascorbic acid, in the beverage product can promote the fading of colors derived from natural sources.

It is an object of the invention to provide beverages and other beverage products having desirable appearance, taste and health properties. It is an object of at least certain embodiments of the invention to provide beverages and other beverage products having improved formulations to inhibit fading of colors derived from natural sources. These and other objects, features and advantages of the invention or of certain embodiments of the invention will be apparent to those skilled in the art from the following disclosure and description of exemplary embodiments.

SUMMARY

In accordance with one aspect, a beverage product is provided that includes at least one color derived from at least one natural source and an $\alpha,\beta$-unsaturated dicarboxylic edible acid. In certain embodiments, the acid may be maleic acid, cis-aconitic acid, trans-aconitic acid, mesaconic acid, itaconic acid, and fumaric acid or combinations thereof. Maleic acid may be provided by addition of maleic anhydride to the beverage product, where it can then hydrolyze to maleic acid. The unsaturated edible acid may be present in an effective amount for inhibition of color fading of the beverage product.

In certain embodiments, fading of colors derived from natural sources is inhibited such that the beverage product has an absorbance value at the optimal wavelength for the color derived from natural sources of no more than 25% less than the light measure value of the same beverage product stored for the same amount of time at 40 degrees Fahrenheit, as measured by a spectrophotometer, following storage of the beverage product for a week after production at a temperature of up to 110 degrees Fahrenheit, or for up to 16 weeks after production at a temperature of up to 70 degrees Fahrenheit.

In accordance with a further aspect, a method is provided for inhibiting fading of colors derived from natural sources under thermal stress by adding to a naturally colored beverage an effective amount of a compound selected from the group consisting of maleic acid, maleic anhydride, cis-aconitic acid, trans-aconitic acid, mesaconic acid, itaconic acid, and fumaric acid and combinations thereof.

In certain exemplary embodiments, the beverage product may be a concentrate, e.g., a syrup. In yet other certain embodiments, the concentrate may be a dry powder mix. In certain embodiments, a plurality of colors derived from natural sources is utilized.

It will be appreciated by those skilled in the art, given the benefit of the following description of certain exemplary embodiments of the beverage and other beverage products disclosed here, that at least certain embodiments of the invention have improved or alternative formulations suitable to provide desirable taste profiles, nutritional characteristics, etc. These and other aspects, features and advantages of the invention or of certain embodiments of the invention will be further understood by those skilled in the art from the following description of exemplary embodiments.

DETAILED DESCRIPTION OF EMBODIMENTS

Figure 1:
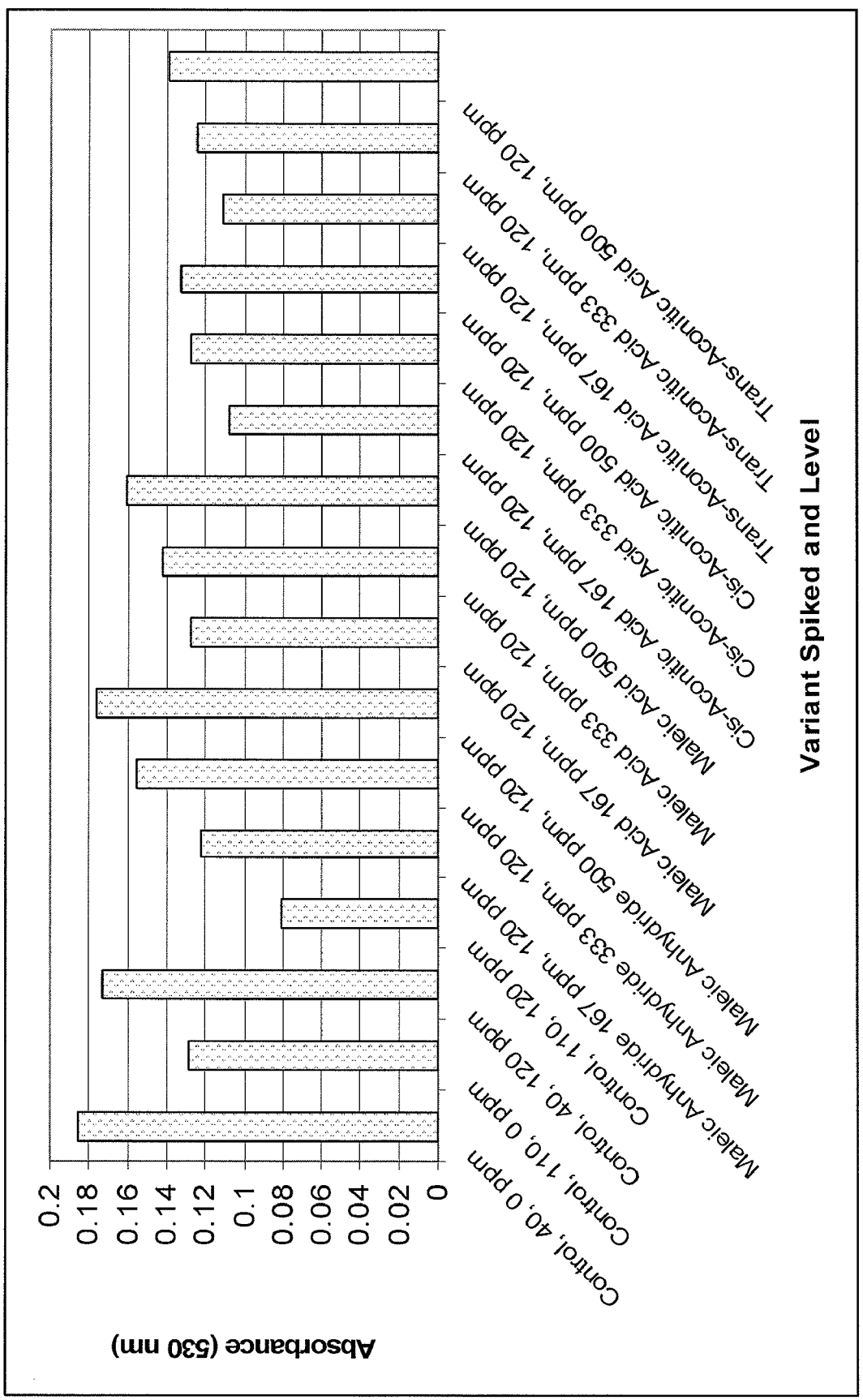
FIG. 1 provides a graph of dose response absorbance values for beverage samples colored with purple sweet potato color and spiked with maleic anhydride, maleic acid, cis-aconitic acid or trans-aconitic acid.

In certain embodiments, the colors derived from natural sources may be an anthocyanin, cyclohexene dione dimers such as safflomine or carthamin and/or a color derived from the reaction of an iridoid and amino acids.

In certain embodiments, following storage of the beverage product for a week after production at a temperature of up to 110 degrees Fahrenheit, the beverage product has an absorbance value of no more than 25% less than the light measure value of the same beverage product stored for the same amount of time at 40 degrees Fahrenheit.

In certain embodiments of the beverage and other products disclosed here, the color derived from one or more natural sources is selected from the group consisting of purple sweet potato, black carrot, purple corn, red beet, *carthamus* yellow, gardenia blue, and combinations thereof. The at least one color derived from natural sources may be present in the beverage product at a concentration of between 150 and 500 ppm. In certain embodiments, ascorbic acid is also present in the beverage product.

It should be understood that beverages and other beverage products in accordance with this disclosure may have any of numerous different specific formulations or constitutions. The formulation of a beverage product in accordance with this disclosure can vary to a certain extent, depending upon such factors as the product's intended market segment, its desired nutritional characteristics, flavor profile and the like. For example, it will generally be an option to add further ingredients to the formulation of a particular beverage embodiment, including any of the beverage formulations described below. Additional (i.e., more and/or other) sweeteners may be added, flavorings, electrolytes, vitamins, fruit juices or other fruit products, tastants, masking agents and the like, flavor enhancers, and/or carbonation typically can be added to any such formulations to vary the taste, mouthfeel, nutritional characteristics, etc.

In general, a beverage in accordance with this disclosure typically comprises at least water, one or more colors derived from natural sources, acidulant and flavoring, and typically also sweetener. Exemplary flavorings which may be suitable for at least certain formulations in accordance with this disclosure include herbal flavoring, fruit flavoring, spice flavorings and others. Carbonation in the form of carbon dioxide may be added for effervescence. Preservatives can be added if desired, depending upon the other ingredients, production technique, desired shelf life, etc. Additional and alternative suitable ingredients will be recognized by those skilled in the art given the benefit of this disclosure.

The beverage products disclosed here include beverages, i.e., ready to drink liquid formulations, beverage concentrates and the like. Beverages include, e.g., enhanced waters, liquid, slurry or solid concentrates, fruit juice-flavored and juice-containing beverages.

At least certain exemplary embodiments of the beverage concentrates contemplated are prepared with an initial volume of water to which the additional ingredients are added. Full strength beverage compositions can be formed from the beverage concentrate by adding further volumes of water to the concentrate. Typically, for example, full strength beverages can be prepared from the concentrates by combining approximately 1 part concentrate with between approximately 3 to approximately 7 parts water. In certain exemplary embodiments the full strength beverage is prepared by combining 1 part concentrate with 5 parts water. In certain exemplary embodiments the additional water used to form the full strength beverages is carbonated water. In certain other embodiments, a full strength beverage is directly prepared without the formation of a concentrate and subsequent dilution.

Water is a basic ingredient in the beverages disclosed here, typically being the vehicle or primary liquid portion in which the remaining ingredients are dissolved, emulsified, suspended or dispersed. Purified water can be used in the manufacture of certain embodiments of the beverages disclosed here, and water of a standard beverage quality can be employed in order not to adversely affect beverage taste, odor, or appearance. The water typically will be clear, colorless, free from objectionable minerals, tastes and odors, free from organic matter, low in alkalinity and of acceptable microbiological quality based on industry and government standards applicable at the time of producing the beverage. In certain typical embodiments, water is present at a level of from about 80% to about 99.9% by weight of the beverage. In at least certain exemplary embodiments the water used in beverages and concentrates disclosed here is "treated water," which refers to water that has been treated to reduce the total dissolved solids of the water prior to optional supplementation, e.g., with calcium as disclosed in U.S. Pat. No. 7,052,725. Methods of producing treated water are known to those of ordinary skill in the art and include deionization, distillation, filtration and reverse osmosis ("r-o"), among others. The terms "treated water," "purified water,", "demineralized water," "distilled water," and "r-o water" are understood to be generally synonymous in this discussion, referring to water from which substantially all mineral content has been removed, typically containing no more than about 500 ppm total dissolved solids, e.g. 250 ppm total dissolved solids.

In certain embodiments, colors derived from natural sources may be used as the only source of added colorant in beverage compositions, thereby avoiding the use of synthetic compounds to provide a desired color to the composition. In alternate embodiments, colors derived from natural sources may be employed in combination with synthetic colors. According to certain embodiments of the beverage products disclosed here, the colors derived from natural sources comprise one or more colors each derived from natural sources. As used herein, the term "colors derived from natural sources" includes any and all extracted products from one or more pigmented biological materials. In certain exemplary embodiments, the biological materials comprise plant materials. The coloring provided by colors derived from natural sources may be due to the presence of flavonoid compounds, such as anthocyanin compounds. Non-limiting examples of colors derived from natural sources comprising anthocyanins include purple sweet potato color, black carrot color, purple carrot color, black currant color and blueberry color. Alternatively, pigmentation can be provided by various other natural compounds, for example cyclohexene dione dimers such as *carthamus* yellow color, colors derived from the reaction of an iridoid and amino acids, such as found in gardenia blue color.

As disclosed above, anthocyanins are a class of compounds that may provide pigmentation to colors derived from natural sources. For example, anthocyanins found in black currants (*Ribes nigrum*) that provide pigmentation include 3-diglucoside and 3-rutinoside of cyanidin and delphinidin. Similarly, blueberries (*Vaccinium augustifolium* or *Vaccinium corymbosum*) typically contain the following anthocyanins that provide pigmentation: 3-glucosides, 3-galactosides, and 3-arabinosides of cyanidin, delphinidin, peonidin, petunidin, and malvidin. A basic chemical structure to describe anthocyanins is shown below. Table 1 illustrates that different anthocyanin compounds may be formed by selecting various chemical groups to be the substituents R through R3.

TABLE 1

Anthocyanin compounds

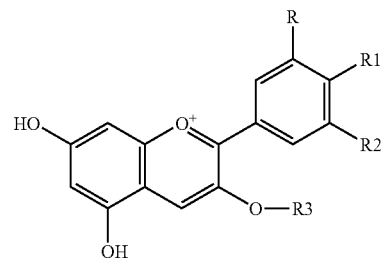

Chemical structure of anthocyanins

| Compound | R | R1 | R2 | R3 |
|---|---|---|---|---|
| Cyanidin 3-O-glycoside[1] | OH | OH | H | arabinose or glucose or galactose |

TABLE 1-continued

Anthocyanin compounds

Chemical structure of anthocyanins

| Compound | R | R1 | R2 | R3 |
|---|---|---|---|---|
| Delphinidin 3-O-glycoside[2] | OH | OH | OH | arabinose or glucose or galactose |
| Malvidin 3-O-glycoside[3] | OCH3 | OH | OCH3 | arabinose or glucose or galactose |
| Peonidin 3-O-glycoside[4] | OCH3 | OH | H | arabinose or glucose or galactose |
| Petunidin 3-O-glycoside[5] | OH | OH | OCH3 | arabinose or glucose or galactose |

[1] Prior R. L., Cao G., Martin A., Sofic E., McEwen J., O'Brien C., Lischner N., Elhenfeldt M, Kalt W., Krewer G., Mainland C. M., J. Agric. Food Chem. 46, 2686 (1998).
[2] Mazza G., Miniati E., Anthocyanins in Fruits, Vegetables and Grains, Boca Raton: CRC, p 362.-Cited in Prior et al., J. Agric. Food Chem. 46, 2686 (1998).
[3] Brenneisen R., Steinegger E., Pharm. Acta Helv. 56, 180 (1981).
[4] Brenneisen R., Steinegger E., Pharm. Acta Helv. 56, 341 (1981).
[5] Jaakola L., Määttä K., Pirttilä A. M., Törrönen R., Kärenlampi S., Hothola A., Plant Physiology 130, 729 (2002).

A blue color derived from natural sources is gardenia blue, which may be formed by the reaction of an iridoid and an amino acid. For example, hydrolysis of the iridoid glycoside geniposide with beta-glucosidase, as indicated below, produces the iridoid genipin. Amino acids, such as glycine, lysine or phenylalanine, will react with the colorless genipin and form blue pigments.

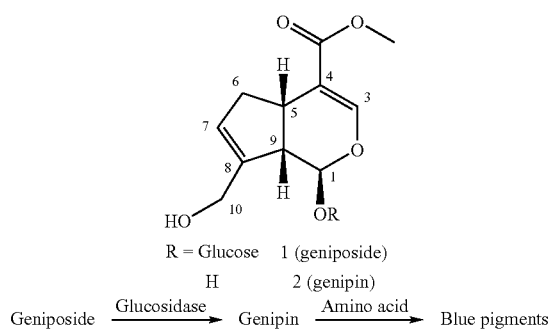

R = Glucose  1 (geniposide)
    H         2 (genipin)

Geniposide —Glucosidase→ Genipin —Amino acid→ Blue pigments

Further examples of colors derived from natural sources are *carthamus* yellow and *carthamus* red. *Carthamus* yellow and *carthamus* red may be derived from safflower (*Carthamus tinctorius*), and include cyclohexene dione dimers, which are classified as chalcone compounds. The chemical structure of *carthamus* yellow, or carthamin, is provided below.

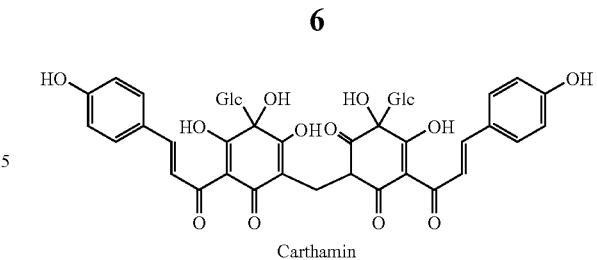

Carthamin

The mechanism for inhibiting fading of colors derived from natural sources of the present invention under thermal stress is not clearly understood. Without wishing to be bound by theory, it appears that the fading of colors derived from natural sources is the result of an electronic reduction of the color molecule. The unsaturated dicarboxylic acids that inhibit fading of colors derived from natural sources are electron deficient and therefore can act as a scavenger of electrons and coined anti-reductant in property. However, of the over sixty compounds tested that had a wide range of electronic character, from electron rich to electron deficient, only alpha, beta-unsaturated dicarboxylic acids were effective to inhibit the fading of colors derived from natural sources under thermal stress. Accordingly, while the inhibition mechanism can be described as an anti-reduction mechanism, inhibition of colors derived from natural sources may be achieved with only certain unsaturated acids, rather than with any compound that has anti-reduction activity.

Acid used in beverages disclosed here can serve any one or more of several functions, including, for example, providing antioxidant activity, lending tartness to the taste of the beverage, enhancing palatability, increasing thirst quenching effect, modifying sweetness and acting as a mild preservative by providing microbiological stability. Ascorbic acid, commonly referred to as "vitamin C", is often employed as an acidulant in beverages to also provide a vitamin to the consumer. However, ascorbic acid acts as an antioxidant in the beverage and promotes the fading of colors derived from natural sources, particularly when the beverage is subjected to thermal stress. It has now been found that the addition of an unsaturated dicarboxylic acid to the beverage can inhibit the fading of colors derived from natural sources, though, even in the presence of ascorbic acid.

For example, fumaric acid, maleic acid, mesaconic acid, itaconic acid and/or aconitic acid may be used alone or in combination with at least one other edible acid in a beverage composition to provide fading inhibition of colors derived from natural sources, as well as to serve any of the other purposes of acids in beverages discussed above. In certain embodiments, between about 30 ppm and 1000 ppm of an unsaturated dicarboxylic acid may be incorporated into a beverage composition to inhibit fading of colors derived from natural sources. In certain embodiments of the invention, the effective amount of one or more unsaturated dicarboxylic acids may be determined either qualitatively or quantitatively. For example, the effective amount may be an amount of unsaturated dicarboxylic acid that inhibits color fading such that any change in color is not readily noticeable to the human eye. Alternatively, the effective amount may be defined quantitatively as the amount of unsaturated dicarboxylic acid that prevents the absorbance of a beverage composition at its optimal wavelength measured using a spectrophotometer from decreasing more than a particular magnitude, such as 25% of the initial absorbance of the composition at its maximum wavelength.

In an embodiment of the invention, fumaric acid may be provided by an acid blend of fumaric acid, malic acid and tartaric acid, which can be commercially obtained as Fruitaric® acid, such as the Fruitaric® acid manufactured by Isegen South Africa (Pty) Ltd, Isipingo, Durban, South Africa. In certain exemplary embodiments, maleic anhydride may be added to a beverage composition with an acid, and over time the maleic anhydride will undergo hydrolysis to form maleic acid within the beverage. Any suitable edible acid may be used to hydrolyze the maleic anhydride, for example citric acid, malic acid, tartaric acid, phosphoric acid, ascorbic acid, lactic acid, formic acid, fumaric acid, gluconic acid, succinic acid and/or adipic acid.

The acid can be used in solution form, for example, and in an amount sufficient to provide the desired pH of the beverage. Typically, for example, the one or more acids of the acidulant are used in amount, collectively, of from about 0.01% to about 1.0% by weight of the beverage, e.g., from about 0.05% to about 0.5% by weight of the beverage, such as 0.1% to 0.25% by weight of the beverage, depending upon the acidulant used, desired pH, other ingredients used, etc. In certain embodiments of the invention, all of the acid included in a beverage composition may be provided by one or more alpha,beta-unsaturated dicarboxylic acids.

The pH of at least certain exemplary embodiments of the beverages disclosed here can be a value within the range of 2.5 to 4.0. The acid in certain exemplary embodiments can enhance beverage flavor. Too much acid can impair the beverage flavor and result in sourness or other off-taste, while too little acid can make the beverage taste flat and reduce microbiological safety of the product. It will be within the ability of those skilled in the art, given the benefit of this disclosure, to select a suitable acid or combination of acids and the amounts of such acids for the acidulant component of any particular embodiment of the beverage products disclosed here.

Sweeteners suitable for use in various embodiments of the beverages disclosed here include nutritive and non-nutritive, natural and artificial or synthetic sweeteners. Suitable non-nutritive sweeteners and combinations of sweeteners are selected for the desired nutritional characteristics, taste profile for the beverage, mouthfeel and other organoleptic factors. Non-nutritive sweeteners suitable for at least certain exemplary embodiments include, but are not limited to, for example, peptide based sweeteners, e.g., aspartame, neotame, and alitame, and non-peptide based sweeteners, for example, sodium saccharin, calcium saccharin, acesulfame potassium, sodium cyclamate, calcium cyclamate, neohesperidin dihydrochalcone, and sucralose. In certain embodiments the sweetener comprises acesulfame potassium. Other non-nutritive sweeteners suitable for at least certain exemplary embodiments include, for example, sorbitol, mannitol, xylitol, glycyrrhizin, D-tagatose, erythritol, meso-erythritol, maltitol, maltose, lactose, fructo-oligosaccharides, Lo Han Guo powder, xylose, arabinose, isomalt, lactitol, maltitol, trehalose, and ribose, and protein sweeteners such as thaumatin, monellin, brazzein, L-alanine and glycine, related compounds, and mixtures of any of them. Lo Han Guo, rebaudioside A, and monatin and related compounds are natural non-nutritive potent sweeteners.

In at least certain exemplary embodiments of the beverages disclosed here, the sweetener component can include nutritive, natural crystalline or liquid sweeteners such as sucrose, liquid sucrose, fructose, liquid fructose, glucose, liquid glucose, glucose-fructose syrup from natural sources such as apple, chicory, honey, etc., e.g., high fructose corn syrup, invert sugar, maple syrup, maple sugar, honey, brown sugar molasses, e.g., cane molasses, such as first molasses, second molasses, blackstrap molasses, and sugar beet molasses, sorghum syrup, Lo Han Guo juice concentrate and/or others.

Such sweeteners are present in at least certain exemplary embodiments in an amount of from about 0.1% to about 20% by weight of the beverage, such as from about 6% to about 16% by weight, depending upon the desired level of sweetness for the beverage. To achieve desired beverage uniformity, texture and taste, in certain exemplary embodiments of the natural beverage products disclosed here, standardized liquid sugars as are commonly employed in the beverage industry can be used. Typically such standardized sweeteners are free of traces of nonsugar solids which could adversely affect the flavor, color or consistency of the beverage.

Non-nutritive, high potency sweeteners typically are employed at a level of milligrams per fluid ounce of beverage, according to their sweetening power, any applicable regulatory provisions of the country where the beverage is to be marketed, the desired level of sweetness of the beverage, etc. It will be within the ability of those skilled in the art, given the benefit of this disclosure, to select suitable additional or alternative sweeteners for use in various embodiments of the beverage products disclosed here.

Preservatives may be used in certain embodiments of the beverages disclosed here. That is, certain exemplary embodiments contain an optional dissolved preservative system. Solutions with a pH below 4 and especially those below 3 typically are "microstable," i.e., they resist growth of microorganisms, and so are suitable for longer term storage prior to consumption without the need for further preservatives. However, an additional preservative system can be used if desired. If a preservative system is used, it can be added to the beverage product at any suitable time during production, e.g., in some cases prior to the addition of the sweetener. As used here, the terms "preservation system" or "preservatives" include all suitable preservatives approved for use in food and beverage compositions, including, without limitation, such known chemical preservatives as benzoic acid, benzoates, e.g., sodium, calcium, and potassium benzoate, sorbates, e.g., sodium, calcium, and potassium sorbate, citrates, e.g., sodium citrate and potassium citrate, polyphosphates, e.g., sodium hexametaphosphate (SHMP), lauryl arginate ester, cinnamic acid, e.g., sodium and potassium cinnamates, polylysine, and antimicrobial essential oils, dimethyl dicarbonate, and mixtures thereof, and antioxidants such as ascorbic acid, EDTA, BHA, BHT, TBHQ, EMIQ, dehydroacetic acid, ethoxyquin, heptylparaben, and combinations thereof.

Preservatives can be used in amounts not exceeding mandated maximum levels under applicable laws and regulations. The level of preservative used typically is adjusted according to the planned final product pH, as well as an evaluation of the microbiological spoilage potential of the particular beverage formulation. The maximum level employed typically is about 0.05% by weight of the beverage. It will be within the ability of those skilled in the art, given the benefit of this disclosure, to select a suitable preservative or combination of preservatives for beverages according to this disclosure. In certain embodiments of the invention, benzoic acid or its salts (benzoates) may be employed as preservatives in the beverage products.

Other methods of beverage preservation suitable for at least certain exemplary embodiments of the beverage products disclosed here include, e.g., aseptic packaging and/or heat treatment or thermal processing steps, such as hot filling and tunnel pasteurization. Such steps can be used to reduce yeast, mold and microbial growth in the beverage products. For example, U.S. Pat. No. 4,830,862 to Braun et al. discloses the use of pasteurization in the production of fruit juice beverages as well as the use of suitable preservatives in carbonated beverages. U.S. Pat. No. 4,925,686 to Kastin discloses a heat-pasteurized freezable fruit juice composition which contains sodium benzoate and potassium sorbate. In general, heat treatment includes hot fill methods typically using high temperatures for a short time, e.g., about 190° F. for 10 seconds, tunnel pasteurization methods typically using lower temperatures for a longer time, e.g., about 160° F. for 10-15 minutes, and retort methods typically using, e.g., about 250° F. for 3-5 minutes at elevated pressure, i.e., at pressure above 1 atmosphere.

The beverage products disclosed here optionally contain a flavor composition, for example, natural and synthetic fruit flavors, botanical flavors, other flavors, and mixtures thereof. As used here, the term "fruit flavor" refers generally to those flavors derived from the edible reproductive part of a seed plant. Included are both those wherein a sweet pulp is associated with the seed, e.g., banana, tomato, cranberry and the like, and those having a small, fleshy berry. The term berry also is used here to include aggregate fruits, i.e., not "true" berries, but that are commonly accepted as a berry. Also included within the term "fruit flavor" are synthetically prepared flavors made to simulate fruit flavors derived from natural sources. Examples of suitable fruit or berry sources include whole berries or portions thereof, berry juice, berry juice concentrates, berry purees and blends thereof, dried berry powders, dried berry juice powders, and the like.

Exemplary fruit flavors include the citrus flavors, e.g., orange, lemon, lime and grapefruit, and such flavors as apple, pomegranate, grape, cherry, and pineapple flavors and the like, and mixtures thereof. In certain exemplary embodiments the beverage concentrates and beverages comprise a fruit flavor component, e.g., a juice concentrate or juice. As used here, the term "botanical flavor" refers to flavors derived from parts of a plant other than the fruit. As such, botanical flavors can include those flavors derived from essential oils and extracts of nuts, bark, roots and leaves. Also included within the term "botanical flavor" are synthetically prepared flavors made to simulate botanical flavors derived from natural sources. Examples of such flavors include cola flavors, tea flavors, and the like, and mixtures thereof. The flavor component can further comprise a blend of the above-mentioned flavors. The particular amount of the flavor component useful for imparting flavor characteristics to the beverages of the present invention will depend upon the flavor(s) selected, the flavor impression desired, and the form of the flavor component. Those skilled in the art, given the benefit of this disclosure, will be readily able to determine the amount of any particular flavor component(s) used to achieve the desired flavor impression.

Juices suitable for use in at least certain exemplary embodiments of the beverage products disclosed here include, e.g., fruit, vegetable and berry juices. Juices can be employed in the present invention in the form of a concentrate, puree, single-strength juice, or other suitable forms. The term "juice" as used here includes single-strength fruit, berry, or vegetable juice, as well as concentrates, purees, milks, and other forms. Multiple different fruit, vegetable and/or berry juices can be combined, optionally along with other flavorings, to generate a beverage having the desired flavor. Examples of suitable juice sources include plum, prune, date, currant, fig, grape, red grape, sweet potato, raisin, cranberry, pineapple, peach, banana, apple, pear, guava, apricot, Saskatoon berry, blueberry, plains berry, prairie berry, mulberry, elderberry, Barbados cherry (acerola cherry), choke cherry, date, coconut, olive, raspberry, strawberry, huckleberry, loganberry, currant, dewberry, boysenberry, kiwi, cherry, blackberry, quince, buckthorn, passion fruit, sloe, rowan, gooseberry, pomegranate, persimmon, mango, rhubarb, papaya, lychee, lemon, orange, lime, tangerine, mandarin orange, tangelo, and pomelo and grapefruit, etc. Numerous additional and alternative juices suitable for use in at least certain exemplary embodiments will be apparent to those skilled in the art given the benefit of this disclosure. In the beverages of the present invention employing juice, juice may be used, for example, at a level of at least about 0.2% by weight of the beverage. In certain exemplary embodiments juice is employed at a level of from about 0.2% to about 40% by weight of the beverage. Typically, juice can be used, if at all, in an amount of from about 1% to about 20% by weight.

Other flavorings suitable for use in at least certain exemplary embodiments of the beverage products disclosed here include, e.g., spice flavorings, such as *cassia*, clove, cinnamon, pepper, ginger, vanilla spice flavorings, cardamom, coriander, root beer, sassafras, ginseng, and others. Numerous additional and alternative flavorings suitable for use in at least certain exemplary embodiments will be apparent to those skilled in the art given the benefit of this disclosure. Flavorings can be in the form of an extract, oleoresin, juice concentrate, bottler's base, or other forms known in the art. In at least certain exemplary embodiments, such spice or other flavors complement that of a juice or juice combination.

The one or more flavorings can be used in the form of an emulsion. A flavoring emulsion can be prepared by mixing some or all of the flavorings together, optionally together with other ingredients of the beverage, and an emulsifying agent. The emulsifying agent may be added with or after the flavorings mixed together. In certain exemplary embodiments the emulsifying agent is water-soluble. Exemplary suitable emulsifying agents include gum acacia, modified starch, carboxymethylcellulose, gum tragacanth, gum ghatti and other suitable gums. Additional suitable emulsifying agents will be apparent to those skilled in the art of beverage formulations, given the benefit of this disclosure. The emulsifier in exemplary embodiments comprises greater than about 3% of the mixture of flavorings and emulsifier. In certain exemplary embodiments the emulsifier is from about 5% to about 30% of the mixture.

Carbon dioxide can be used to provide effervescence to certain exemplary embodiments of the beverages disclosed here. Any of the techniques and carbonating equipment known in the art for carbonating beverages can be employed. Carbon dioxide can enhance the beverage taste and appearance and can aid in safeguarding the beverage purity by inhibiting and destroying objectionable bacteria. In certain embodiments, for example, the beverage has a $CO_2$ level up to about 7.0 volumes carbon dioxide. Typical embodiments may have, for example, from about 0.5 to 5.0 volumes of carbon dioxide. As used here and independent claims, one volume of carbon dioxide is defined as the amount of carbon dioxide absorbed by any given quantity of water at 60° F. (16° C.) temperature and atmospheric pressure. A volume of gas occupies the same space as does the water by which it is absorbed. The carbon dioxide content can be selected by those skilled in the art based on the desired level of effervescence and the impact of the carbon dioxide on the taste or mouthfeel of the beverage. The carbonation can be natural or synthetic.

The beverage concentrates and beverages disclosed here may contain additional ingredients, including, generally, any of those typically found in beverage formulations. These additional ingredients, for example, can typically be added to a stabilized beverage concentrate. Examples of such additional ingredients include, but are not limited to, caffeine, caramel and other coloring agents or dyes, antifoaming agents, gums, emulsifiers, tea solids, cloud components, and mineral and non-mineral nutritional supplements. Examples of non-mineral nutritional supplement ingredients are known to those of ordinary skill in the art and include, for example, antioxidants and vitamins, including Vitamins A, D, E (tocopherol), C (ascorbic acid), $B_1$ (thiamine), $B_2$ (riboflavin), $B_3$ (nicotinamide), $B_4$ (adenine), $B_5$ (pantothenic acid, calcium), $B_6$ (pyridoxine HCl), $B_{12}$ (cyanocobalamin), and $K_1$ (phylloquinone), niacin, folic acid, biotin, and combinations thereof. The optional non-mineral nutritional supplements are typically present in amounts generally accepted under good manufacturing practices. Exemplary amounts are between about 1% and about 100% RDV, where such RDV are established. In certain exemplary embodiments the non-mineral nutritional supplement ingredient(s) are present in an amount of from about 5% to about 20% RDV, where established.

EXAMPLES

Example 1

The efficacy for inhibition of fading of colors derived from one or more natural sources in beverage products exhibited by various compounds was tested experimentally by adding between about 14 and about 167 parts per million (ppm, mg/L) of a compound to a strawberry kiwi beverage matrix. The compounds chosen were selected to provide a wide range of electronic character, from electron rich to electron deficient. The specific compounds and the mass or volume of each compound employed in a strawberry kiwi beverage matrix are listed below in Table 2. The ingredients of the strawberry kiwi beverage matrix are listed below in Table 3.

Strawberry kiwi beverage products were prepared as formulated and cold filled into 300 mL glass bottles. Experimentation for fading of colors derived from natural sources was conducted by opening each of the bottled strawberry kiwi beverages and adding specified amounts (i.e., spiking) of each compound listed in Table 2. The beverages were re-capped and shaken to dissolve the addition. The strawberry kiwi beverages were then placed in an incubator set at 110° F. The strawberry kiwi beverages were tested for absorbance three times a week until the samples were deemed too degraded to be analyzed.

TABLE 2

Compounds tested for inhibition of fading of colors derived from natural sources in strawberry kiwi beverages.

| Ingredient | Amount added to 300 mL sample |
|---|---|
| 2,3-Diaminoproponic Acid | 50 mg |
| 2-acetyl-1,3-indanedione | 50 mg |
| 2-Acetyl-1-tetralone | 50 mg |
| 2-Pyridylhydroxymethane sulfonic acid | 50 mg |
| 3,4-Pyridine-dicarboximide | 50 mg |
| 4-amino Antipyrine | 11.5 mg |
| 4-Aminopyridine | 50 mg |
| 2,2'-Azino-bis(3-ethylbenzthiazoline-6-sulfonic acid) | 4.9 mg |
| Alloxan monohydrate | 50 mg |
| Antipyrine | 5.4 mg |
| Applephenone | 8.55 mg |
| Black raspberry seed powder | 20 mg |
| Chelidonic Acid | 50 mg |
| Chlorogenic Acid | 5.3 mg |
| Chondroitin Sulfate | 50 mg |
| cis-Aconitic Acid | 10 mg |
| Coumalic Acid | 50 mg |
| Croconic Acid Na2 | 50 mg |
| Dipyridamole | 4.2 mg |
| DL-Histidine | 6.8 mg |

TABLE 2-continued

Compounds tested for inhibition of fading of colors derived from natural sources in strawberry kiwi beverages.

| Ingredient | Amount added to 300 mL sample |
|---|---|
| Furil | 50 mg |
| Gallic Acid | 7.5 mg |
| Glutathione reduced | 5.2 mg |
| Guanido acetic acid | 5.4 mg |
| Homoeriodictyol, disodium | 10 mg |
| Hinokitiol | 50 uL |
| Hydroquinone | 20 mg |
| Indoxyl sulfate potassium salt | 20 mg |
| Kojic Acid | 50 mg |
| L-Ergothioneine | 20 mg |
| L-Lysine | 50 mg |
| L-Pyroglutamic Acid | 50 mg |
| Maleic anhydride briquettes | 50 mg |
| Melatonin | 6.5 mg |
| NAF A (Ogawa & Co. Ltd. - Avri Companies Inc.) | 200 ul |
| NAF B | 100 mg |
| NAF C | 50 uL |
| NAF D | 44.5 mg |
| NAF E | 50 mg |
| Nordihydroguaiaretic Acid | 50 mg |
| Oligo-glucosamine | 20 mg |
| O-phospho-L-serine | 5.5 mg |
| Phentolamine methane-sulfonate | 10 mg |
| Phytic Acid | 25 uL |
| Polyvinylpyrrolidone | 6.9 mg |
| p-Toluenesulfonic Acid Monohydrate | 50 mg |
| Resveratrol | 3.3 mg |
| Rhodizonic Acid disodium salt | 50 mg |
| Salicylic Acid | 13.6 mg |
| Enzymatically modified isoquercitrin | 200 ul |
| Chinese bayberry extract | 200 ul |
| Shikimic Acid | 50 mg |
| Tetrahydroxy-1,4-quinone hydrate | 50 mg |
| Tomatine | 50 mg |
| Trigonelline | 50 mg |
| 6-Hydroxy-2,5,7,8-tetramethylchroman-2-carboxylic acid | 50 mg |
| Tropic Acid | 50 mg |
| Uric Acid | 50 mg |
| Urocanic Acid | 50 mg |
| Usnic Acid | 5 mg |
| Vitamin K1 | 50 mg |

TABLE 3

Strawberry Kiwi Beverage Matrix.

| Ingredient | g/L Beverage |
|---|---|
| Dry Sugar | 41.824 |
| Sodium Benzoate | 0.200 |
| Potassium Citrate | 0.250 |
| Ascorbic Acid | 0.120 |
| Citric Acid Anhydrous | 0.771 |
| Purple Sweet Potato Liquid Color | 0.218 |
| Erythritol | 28.006 |
| Calcium Lactate | 0.196 |
| Treated Water | To 1 Liter |

In addition to the spiked strawberry kiwi composition samples stored at 110° F., control samples were tested to monitor the change in color of the strawberry kiwi composition, and stored at either 40° F. or at 110° F. Only samples to which 50 mg maleic anhydride briquettes had been added showed promise to inhibit fading of purple sweet potato color in strawberry kiwi samples stored at 110° F. Fifty milligrams of maleic anhydride briquettes placed in a 300 mL strawberry kiwi composition provided a solution containing 167 ppm of dissolved maleic anhydride.

Example 2

The ability of maleic anhydride and compounds having a similar structure thereof to inhibit natural purple sweet potato color fading in strawberry kiwi compositions was tested by adding 167 ppm, 333 ppm or 500 ppm of one of the compounds to a strawberry kiwi beverage matrix. The compounds having a similar structure were maleic acid, cis-aconitic acid and trans-aconitic acid. The strawberry kiwi beverage samples were handled and analyzed by the same methods as the samples in Example 1.

The spiked strawberry kiwi composition samples were stored for one week at a temperature of 110° F. Further, control samples were tested to measure the change in color of the strawberry kiwi composition without any added compounds and stored at 40° F. for one week, with either no added ascorbic acid or with 120 ppm ascorbic acid, or at 110° F. for one week, also with either no added ascorbic acid or with 120 ppm ascorbic acid. Following storage, the absorbance was measured on a spectrophotometer to determine the absorbance value of each sample. The wavelength of maximum absorbance for the strawberry kiwi composition was 530 nm, thus the absorbance was measured at 530 nm throughout the course of the experiment. Fading of the purple sweet potato color would result in a decreased absorbance value at 530 nm. Accordingly, inhibition of fading of the purple sweet potato color was determined by measuring the extent to which the absorbance value decreased over time. The absorbance values of the samples for the dose response experiment are shown in FIG. 1. It should be noted that the liquid sweet potato color was a pigment solution rather than a pure pigment liquid. The solution was characterized by having an absorbance between 0.300 and 0.340 at 530 nm when diluted to a level of 0.02% in pH 3.0 McIlvaine's buffer.

The results for the control sample illustrate the effects of both heat and ascorbic acid on color fading of the strawberry kiwi samples. FIG. 1 illustrates that storing the samples at a temperature of 110° F. for one week, as compared to storing the control sample at 40° F. for one week, resulted in a decrease in the absorbance at 530 nm from 0.185 to 0.129, which is a loss of about 30%. The combination of 120 ppm ascorbic acid and a temperature of 110° F. for one week resulted in further color fading of the strawberry kiwi compositions. The absorbance decreased to 0.081, which is a loss of about 56%.

The addition of 500 ppm maleic anhydride, even in the presence of 120 ppm ascorbic acid, inhibited the color fading of the strawberry kiwi composition such that the absorbance only decreased about 5%, from 0.185 to 0.177 after one week at 110° F. Maleic acid, cis-aconitic acid and trans-aconitic acid also inhibited color fading of strawberry kiwi samples containing 120 ppm ascorbic acid and stored at 110° F. for one week. In samples spiked with 500 ppm maleic acid, the absorbance decreased from 0.185 to 0.161, which is a loss of about 13%. Similarly, the absorbance decreased about 28% in samples spiked with 500 ppm cis-aconitic acid, from 0.185 to 0.133, and about 25% in samples spiked with trans-aconitic acid, from 0.185 to 0.139.

In a preferred embodiment, the decrease in the absorbance value at 530 nm for strawberry kiwi beverage samples is no more than about 10% following storage at 110° F. for one week, as compared to the absorbance of the same beverage stored at 40° F. for one week. In more general terms, the absorbance value of any beverage containing colors derived from natural sources may decrease about 15% or less during storage under thermal stress, when the beverage comprises a fading inhibitor, such as fumaric acid. This quantitative measure closely aligns with a visual qualitative assessment of the beverages as the consumer would observe, as discussed below in Example 3. Thermal stress conditions may include up to one week of storage at a temperature of up to 110° F., following manufacture of the beverage, or up to twelve weeks of storage at a temperature of up to 90° F.

Example 3

The amount of color fading that may be noticed by a consumer was estimated by performing a qualitative study of the different amounts of sweet potato color in a strawberry kiwi matrix. Strawberry kiwi beverage samples were prepared having varying amounts of the liquid sweet potato color, and the absorbance of each sample was measured at 530 nm on a spectrophotometer. The percent of color for each sample, where 0.218 g/L liquid sweet potato color is 100% color, is listed in Table 4, along with the measured absorbance for the corresponding sample. The difference in the measured absorbance of each sample from the absorbance of the 100% color sample was consistent with the difference in the percent of liquid sweet potato color, which indicates that the color of the sample at 530 nm was effectively provided only by the liquid sweet potato color.

A human observer compared sets of two samples side by side, and did not notice a difference between the 100% color sample and any one of the 99%, 98%, or 90% samples. However, the human observer did notice a visual difference between the 100% color sample and the 85% color sample. Accordingly, it may be preferable to inhibit color fading of compositions containing colors derived from natural sources sufficient to prevent the absorbance of the composition from decreasing more than 10% and potentially being noticeable to the human eye.

TABLE 4

Absorbance of Strawberry Kiwi Beverage Matrix Samples Having Different Amounts of Liquid Sweet Potato Color.

| Percent of color in the strawberry kiwi beverage matrix | Absorbance at 530 nm |
| --- | --- |
| 100 | 0.277 |
| 99 | 0.274 |
| 98 | 0.271 |
| 90 | 0.249 |
| 85 | 0.235 |
| 80 | 0.193 |
| 70 | 0.151 |
| 60 | 0.108 |

Example 4

The ability of fumaric acid to inhibit natural purple sweet potato color fading in strawberry kiwi compositions was tested by adding 167 ppm, 333 ppm or 500 ppm of fumaric acid to a strawberry kiwi beverage matrix. The strawberry kiwi beverage samples were handled and analyzed by the same methods as the samples in Examples 1 and 2. Taste tests of the samples indicated that the strawberry kiwi compositions containing 167 ppm, 333 ppm and 500 ppm all had acceptable flavor and tartness taste profiles.

Figure 2:
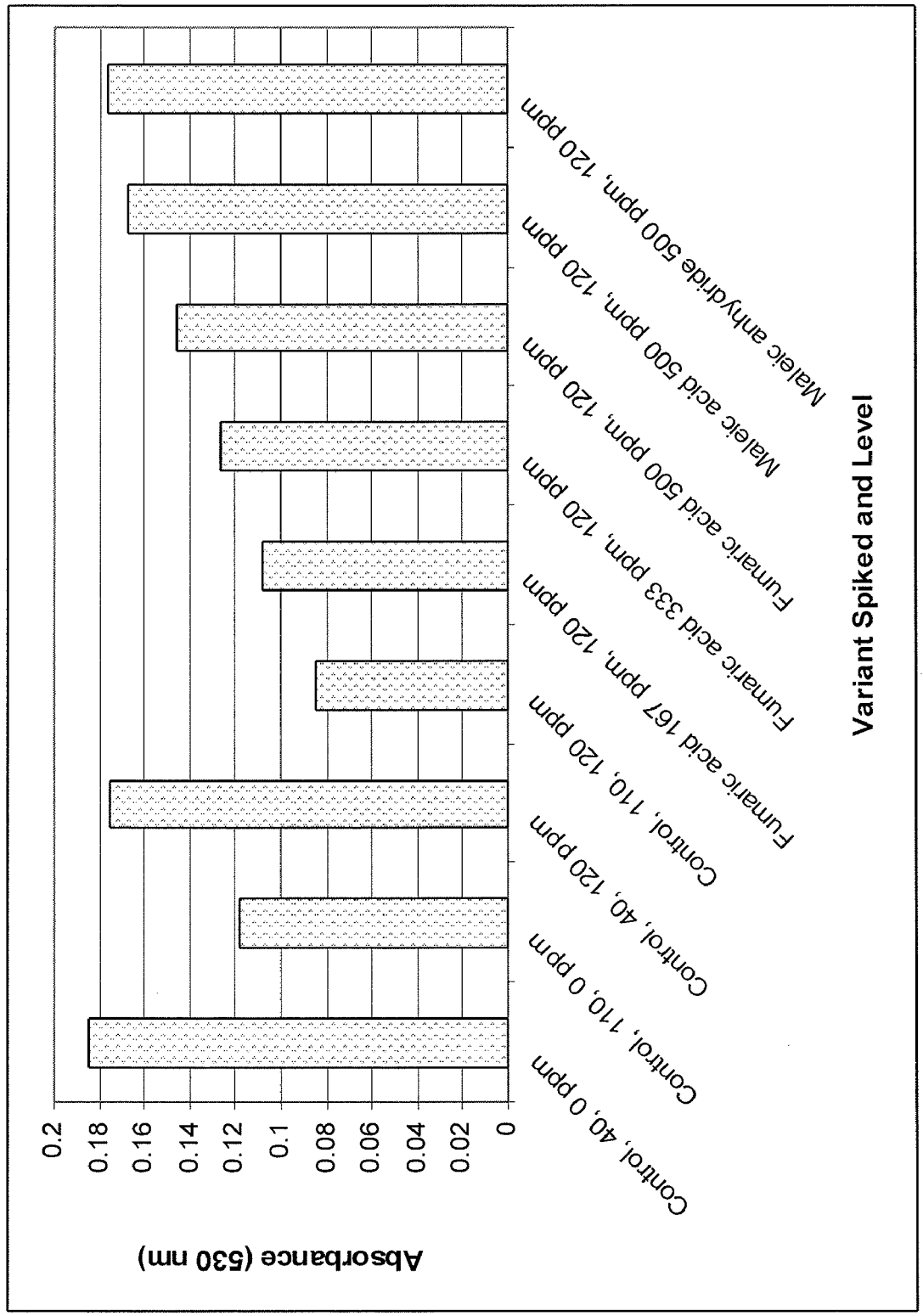
FIG. 2 provides a graph of dose response absorbance values for beverage samples colored with purple sweet potato color and spiked with fumaric acid, maleic acid or maleic anhydride.

The spiked strawberry kiwi composition samples were stored for one week at a temperature of 110° F. Further, control samples were tested to measure the change in color of the strawberry kiwi composition without any added fumaric acid and stored at 40° F. for one week, with either no added ascorbic acid or with 120 ppm ascorbic acid, or at 110° F. for one week, also with either no added ascorbic acid or with 120 ppm ascorbic acid. Following storage, the absorbance was measured on a spectrophotometer to determine the absorbance value of each sample. Inhibition of fading of the purple sweet potato color was determined by measuring the extent to which the absorbance value at 530 nm decreased over time. The absorbance values of the samples for the dose response experiment for fumaric acid are shown in FIG. 2.

Similar to Example 2, the results for the control sample illustrate the effects of both heat and ascorbic acid on color fading of the strawberry kiwi samples. FIG. 2 illustrates that storing the control sample at a temperature of 110° F. for one week, as compared to storing the control sample at 40° F. for one week, resulted in a decrease in the absorbance at 530 nm from 0.185 to 0.119, which is a loss of about 36%. The combination of 120 ppm ascorbic acid and a temperature of 110° F. resulted in further color fading of the strawberry kiwi compositions. The absorbance decreased to 0.085, which is a loss of about 54%.

The addition of 167 ppm fumaric acid did not provide an inhibition in color fading as the absorbance of a strawberry kiwi sample decreased from 0.185 to 0.109, or about 41%, which was a greater loss of absorbance than in the control sample stored at 110° F. for one week. However, the absorbance of a strawberry kiwi sample containing 333 ppm of fumaric acid and subjected to 110° F. for one week decreased about 31%, from 0.185 to 0.127, and the absorbance of a strawberry kiwi sample containing 500 ppm of fumaric acid only decreased about 21%, from 0.185 to 0.146. The ability of fumaric acid to inhibit color fading is dose dependent, with greater inhibition as the concentration of the fumaric is increased in the beverage sample.

Example 5

The ability of unsaturated acids to inhibit fading of gardenia blue color fading in strawberry kiwi compositions was tested by adding 167 ppm, 333 ppm or 500 ppm of fumaric acid or 500 ppm of maleic acid or 500 ppm of maleic anhydride to a strawberry kiwi beverage matrix containing 218 ppm of liquid gardenia blue color, instead of purple sweet potato color. The strawberry kiwi beverage samples were handled and analyzed by the same methods as the samples in Examples 1 and 2. It should be noted that the liquid gardenia blue color was a pigment solution rather than a pure pigment liquid. The liquid gardenia blue color was characterized by exhibiting an absorbance of between 54.0 and 56.0 at 600 nm when diluted by a factor of ten in pH 6.0 buffer.

Figure 3:
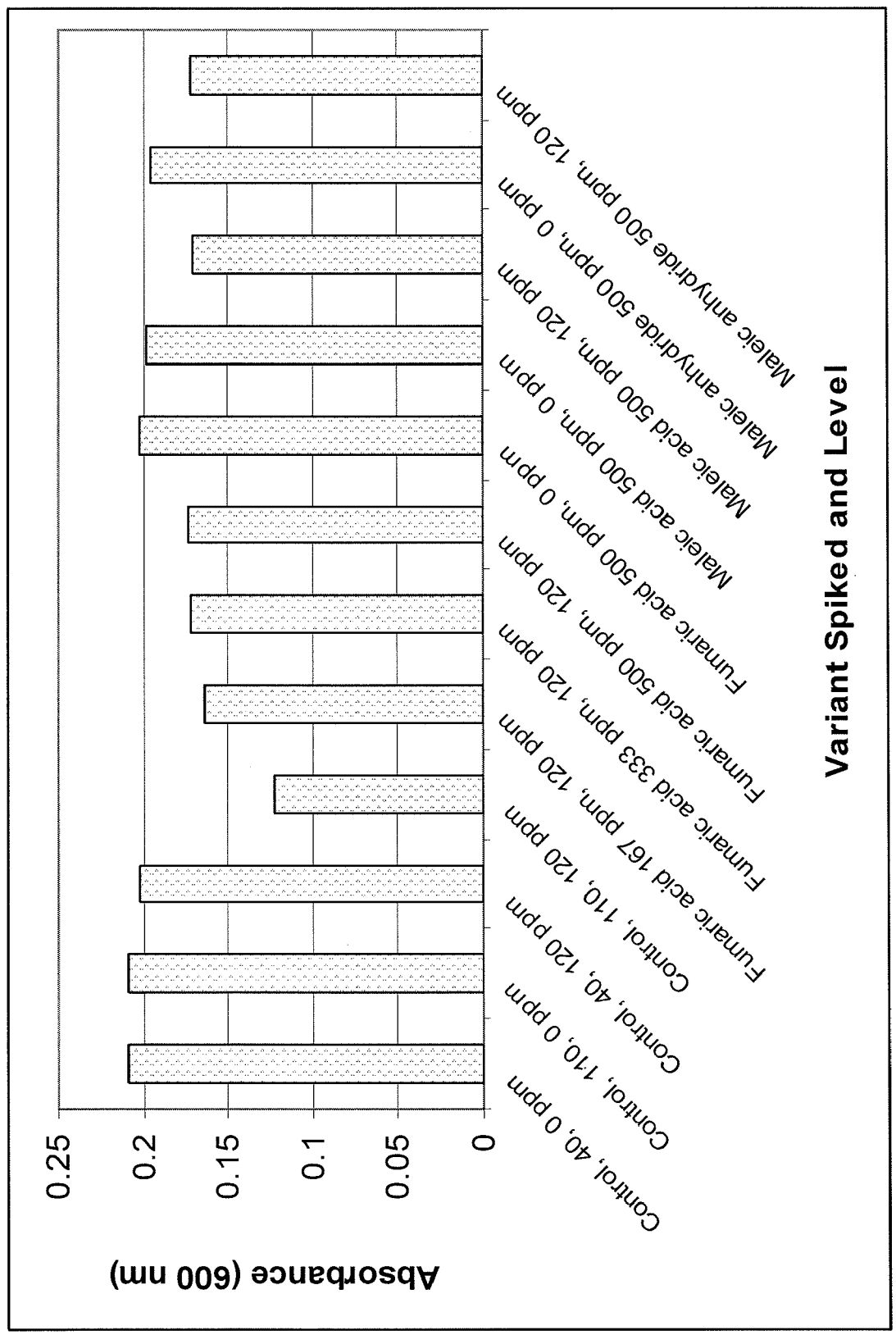
FIG. 3 provides a graph of dose response absorbance values for beverage samples colored with gardenia blue color and spiked with fumaric acid, maleic acid or maleic anhydride.

The spiked strawberry kiwi composition samples were stored for one week at a temperature of 110° F. Further, control samples were tested to measure the change in color of the strawberry kiwi composition without any added unsaturated acid and stored at 40° F. for one week, with either no added ascorbic acid or with 120 ppm ascorbic acid, or at 110° F. for one week, also with either no added ascorbic acid or with 120 ppm ascorbic acid. Following storage, the absorbance was measured on a spectrophotometer to determine the absorbance value of each sample. The maximum absorbance of the strawberry kiwi samples containing gardenia blue was 600 nm, thus the absorbance measurements during the experiment were all taken at 600 nm. Inhibition of fading of the gardenia blue color was determined by measuring the extent to which the absorbance value at 600 nm decreased over time. The absorbance values of the samples for the gardenia blue experiment for gardenia blue are shown in FIG. 3.

Similar to Example 4, the results for the control sample illustrate the effects of both heat and ascorbic acid on gardenia blue color fading of the strawberry kiwi samples. FIG. 3 illustrates that storing the control sample at a temperature of 110° F. resulted in a decrease in the absorbance at 600 nm after one week from 0.209 to 0.198, which is a loss of about 5%. The combination of 120 ppm ascorbic acid and a temperature of 110° F. resulted in further color fading of the strawberry kiwi compositions. The absorbance decreased from 0.209 to 0.112, which is a loss of about 46%.

The addition of 167 ppm fumaric acid inhibited gardenia blue color fading, with a decrease of absorbance of a strawberry kiwi sample of about 22%, from 0.209 to 0.164. Likewise, the absorbance of a strawberry kiwi sample containing 333 ppm of fumaric acid and subjected to 110° F. for one week decreased about 18%, from 0.209 to 0.172, and the absorbance of a strawberry kiwi sample containing 500 ppm of fumaric acid decreased about 17%, to 0.174.

Example 6

The ability of unsaturated acids to inhibit fading of color fading in juice beverage compositions was tested by adding 100 ppm, 200 ppm, 300 ppm or 400 ppm of fumaric acid to a french exotic juice beverage matrix containing color provided mainly by sweet potato juice. The ingredients of the french exotic juice beverage matrix are listed below in Table 5. The amount of citric acid anhydrous added to the compositions was determined by subtracting 0.667 g/L for each 0.1 g/L of fumaric acid in the composition, from an initial amount of citric acid anhydrous of 1.45 g/L. For example, in the samples containing 300 ppm fumaric acid, 1.25 g/L citric acid anhydrous was used: 1.45 g/L−(3×0.667 g/L)=1.25 g/L. The french exotic juice beverage samples were handled and analyzed by the same methods as the samples in Example 1.

Taste tests of the samples indicated that the french exotic juice composition samples containing 100 ppm fumaric acid had less flavor than french exotic juice compositions containing no fumaric acid. The french exotic juice samples containing 200 ppm and 300 ppm fumaric acid both had a different flavor and greater tartness than juice compositions containing no fumaric acid. The french exotic juice samples containing 400 ppm fumaric acid had a different flavor that was more dry and astringent than juice compositions containing no fumaric acid. Further, there was visible oil swirl in the french exotic juice compositions containing either 300 ppm or 400 ppm fumaric acid.

TABLE 5

| French Exotic Juice Beverage Matrix. ||
| Ingredient | Amount (g/L) |
| --- | --- |
| Dry Sugar | 96.00 |
| Sodium Citrate Dihydrate | 0.20 |
| Ascorbic Acid | 0.20 |
| Citric Acid Anhydrous | variable |
| Fumaric Acid | variable |
| Exotic Juice Blend (concentrates of pomegranate juice, red grape juice and peach juice; sweet potato juice and water) | 4.40 |

TABLE 5-continued

French Exotic Juice Beverage Matrix.

| Ingredient | Amount (g/L) |
| --- | --- |
| Apple Juice Concentrate | 17.00 |
| Xanthan Gum | 0.12 |
| Pomegranate Mix Flavor | 0.279 |
| Treated Water | To 1 Liter |

The spiked french exotic juice composition samples were stored for seven weeks at a temperature of 110° F. Further, control samples were tested to measure the change in color of the french exotic juice composition without any added unsaturated acid and stored at 40° F. for seven weeks, or at 110° F. for seven weeks. The samples were visually evaluated after one week, three weeks and seven weeks. Inhibition of fading of the color was determined qualitatively by observing the changes in color over time. After one week of storage at 40° F., neither the control sample nor any of the juice composition samples containing fumaric acid showed a change in color. In contrast, after one week of storage at 110° F., both the control sample and the juice composition sample containing 100 ppm fumaric acid showed slight fading, while the juice composition samples containing 200 ppm, 300 ppm and 400 ppm fumaric acid showed no change in color.

After three weeks of storage at 110° F., the control sample and juice compositions containing 100 ppm and 200 ppm showed substantial fading, and the extent of the fading was inversely proportional to the amount of fumaric acid present in the samples. The juice composition samples containing 300 ppm and 400 ppm fumaric acid showed slight fading but still both had an acceptable appearance. After seven weeks of storage at 110° F., all of the samples showed noticeable browning and fading, with less fading the more fumaric acid the sample contained. The juice composition samples containing 300 ppm and 400 ppm fumaric acid still retained most of their reddish color. Consequently, the use of at least 300 ppm fumaric acid was effective to inhibit fading of colors from natural sources in a juice beverage.

Example 7

The effect of fumaric acid on ascorbic acid was tested in two beverage matrices to confirm that the inhibition of fading of colors derived from natural sources was not actually due to degradation of the ascorbic acid. Samples of strawberry kiwi compositions were prepared using the matrix of Table 2, except that they contained a higher level of ascorbic acid (500 ppm, instead of 120 ppm) and 630 ppm of fumaric acid instead of any citric acid. In addition, samples of blackberry grape compositions were prepared using the matrix of Table 6 below. Half of the strawberry kiwi and blackberry grape samples were stored at 90° F. and half of the samples were stored at 110° F. for one week.

TABLE 6

Blackberry Grape Beverage Matrix.

| Ingredient | g/L Beverage |
| --- | --- |
| Dry Sugar | 39.907 |
| Potassium Citrate | 0.250 |
| Ascorbic Acid | 0.500 |
| Fumaric Acid | 0.660 |
| Black Carrot Juice Liquid Color | 0.410 |
| Blackberry Grape Flavor | 1.306 |

TABLE 6-continued

Blackberry Grape Beverage Matrix.

| Ingredient | g/L Beverage |
| --- | --- |
| Vitamin Blend | 0.250 |
| Herb Blend | 0.126 |
| Erythritol | 28.006 |
| Calcium Lactate | 0.196 |
| Treated Water | To 1 Liter |

Figure 4:
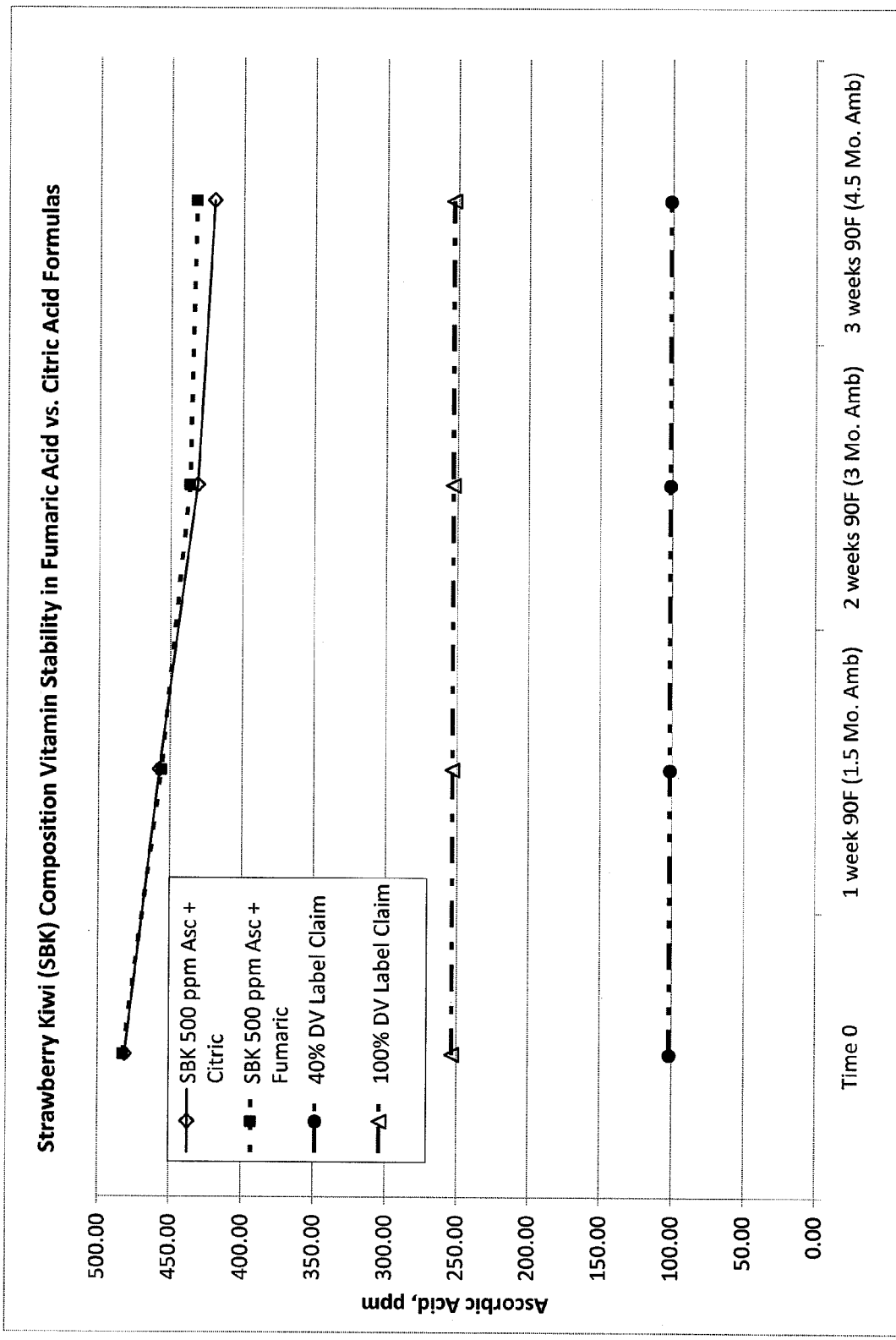
FIG. 4 provides a graph of ascorbic acid concentrations in strawberry kiwi compositions containing fumaric acid or citric acid.
Figure 5:
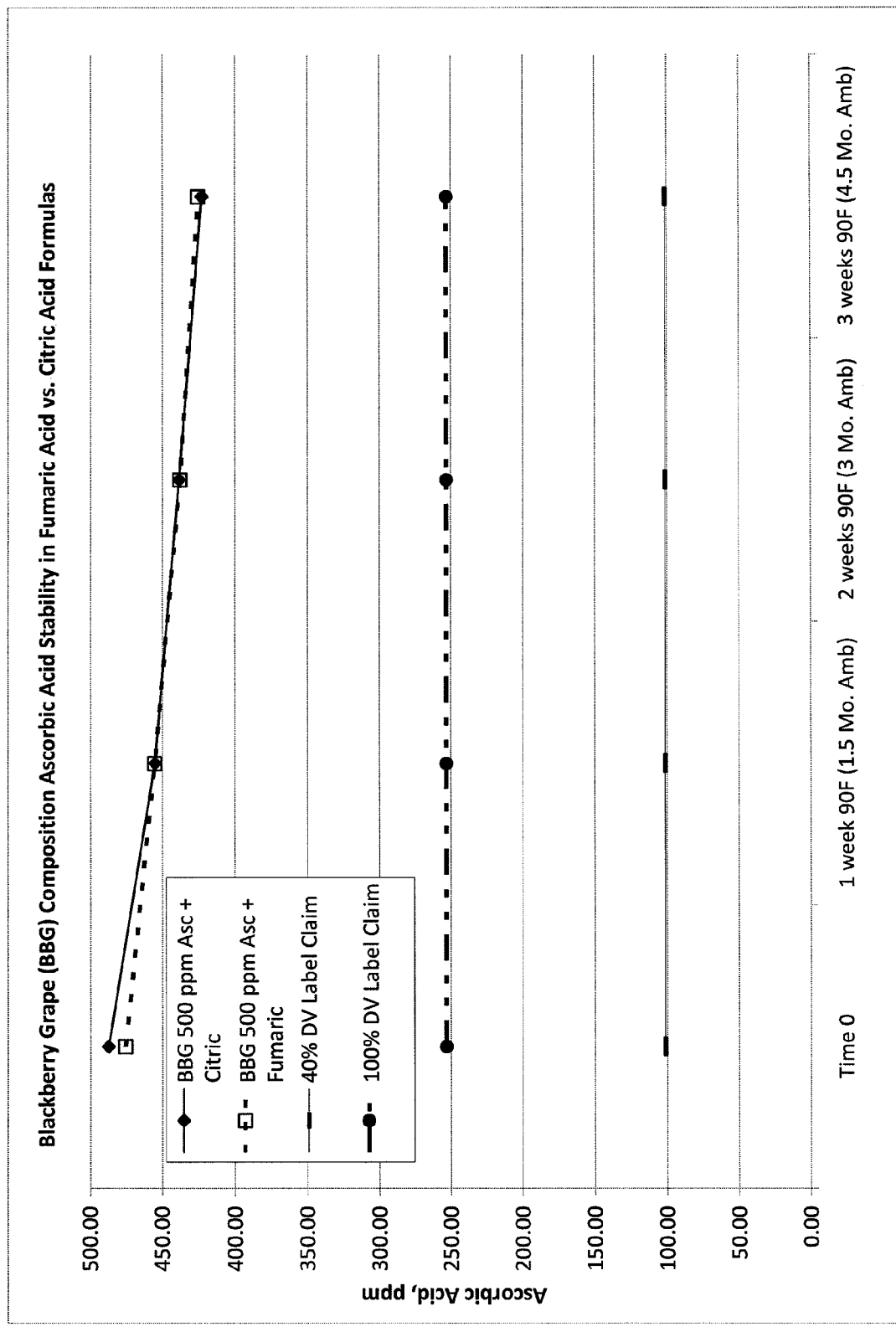
FIG. 5 provides a graph of ascorbic acid concentrations in blackberry grape compositions containing fumaric acid or citric acid.

The samples were analyzed for their concentrations of ascorbic acid both prior to and following storage. The results of the analyses for the strawberry kiwi compositions and the blackberry grape compositions are illustrated in FIGS. 4 and 5, respectively. For reference, data points marking the level of ascorbic acid required to make either a 100% Daily Value Vitamin C claim or a 40% Daily Value of Vitamin C claim are also provided in the figures.

After one week of storage at 90° F., there was only a 5.4% loss in the amount of ascorbic acid in the strawberry kiwi compositions, from 482.18 ppm to 456.01 ppm. After one week of storage at 110° F., there was a loss of 9.3% of the ascorbic acid, from 482.18 ppm to 437.39. A control sample of a strawberry kiwi composition according to Table 2, which contained citric acid instead of fumaric acid, showed losses of ascorbic acid following storage for one week at 90° F. and 110° F. of 4.9% and 14.4%, respectively.

After one week of storage at 90° F., there was only a 4.2% loss in the amount of ascorbic acid in the blackberry grape compositions, from 475.47 ppm to 455.35 ppm. After one week of storage at 110° F., there was a loss of 10.1% of the ascorbic acid, from 475.47 ppm to 427.64. A control sample of a blackberry grape composition according to Table 6, but which contained citric acid instead of fumaric acid, showed losses of ascorbic acid following storage for one week at 90° F. and 110° F. of 6.6% and 14.9%, respectively. Accordingly, the presence of fumaric acid in strawberry kiwi compositions or blackberry grape compositions does not degrade ascorbic acid, and therefore does not prevent ascorbic acid from promoting the degradation of colors derived from natural sources.

Given the benefit of the above disclosure and description of exemplary embodiments, it will be apparent to those skilled in the art that numerous alternate and different embodiments are possible in keeping with the general principles of the invention disclosed here. Those skilled in this art will recognize that all such various modifications and alternative embodiments are within the true scope and spirit of the invention. The appended claims are intended to cover all such modifications and alternative embodiments. It should be understood that the use of a singular indefinite or definite article (e.g., "a," "an," "the," etc.) in this disclosure and in the following claims follows the traditional approach in patents of meaning "at least one" unless in a particular instance it is clear from context that the term is intended in that particular instance to mean specifically one and only one. Likewise, the term "comprising" is open ended, not excluding additional items, features, components, etc.

What is claimed is:
1. A beverage product comprising:
    water;
    a color derived from at least one natural source; and
    a compound in an effective amount to inhibit fading of the color derived from at least one natural source, the compound comprising an alpha,beta-unsaturated dicarboxy- lic acid, and wherein the compound is present at a concentration of between about 30 ppm and about 1000 ppm.

2. The beverage product of claim 1, wherein the compound is selected from the group consisting of maleic acid, cis-aconitic acid, trans-aconitic acid, mesaconic acid, itaconic acid, and fumaric acid and combinations thereof.

3. The beverage product of claim 1, wherein the color derived from at least one natural source is selected from the group consisting of anthocyanins, cyclohexene dione dimers such as carthamin and/or a color derived from the reaction of an iridoid and amino acids, and combinations thereof.

4. The beverage product of claim 3, wherein the color derived from at least one natural source is selected from the group consisting of purple sweet potato, black carrot, purple carrot, black currant, blueberry, *carthamus* yellow, gardenia blue, and combinations thereof.

5. The beverage product of claim 1, wherein, after one week of storage at a temperature of up to 110° F. following manufacture, the beverage has an absorbance value at the optimal wavelength for the color derived from at least one natural source of no more than 25% less than the light measure value of the same beverage product stored for the same amount of time at 40° F., as measured by a spectrophotometer.

6. The beverage product of claim 1, wherein, after up to sixteen weeks of storage at a temperature of up to 70° F. following manufacture, the beverage has an absorbance value at the optimal wavelength for the color derived from at least one natural source of no more than 25% less than the light measure value of the same beverage product stored for the same amount of time at 40° F., as measured by a spectrophotometer.

7. The beverage product of claim 1, further comprising ascorbic acid.

8. The beverage product of claim 1, further comprising malic acid and tartaric acid.

9. The beverage product of claim 1, further comprising juice.

10. A beverage product comprising:
water;
a color derived from at least one natural source, the color selected from the group consisting of anthocyanins, cyclohexene dione dimers such as carthamin and/or a color derived from the reaction of an iridoid and amino acids and combinations thereof;
an unsaturated acid selected from the group consisting of fumaric acid, maleic acid, cis-aconitic acid, trans-aconitic acid and combinations thereof, wherein the unsaturated acid is present at a concentration of between about 30 ppm and about 1000 ppm; and
ascorbic acid.

11. The beverage product of claim 10, wherein the color derived from at least one natural source is selected from the group consisting of purple sweet potato, black carrot, purple carrot, black currant, blueberry, *carthamus* yellow, gardenia blue, and combinations thereof.

12. The beverage product of claim 10, wherein the ascorbic acid is present at a concentration of between about 50 ppm and about 500 ppm.

13. The beverage product of claim 10, wherein, after up to sixteen weeks of storage at a temperature of up to 70° F. following manufacture, the beverage has an absorbance value at the optimal wavelength for the color derived from at least one natural source of no more than 25% less than the light measure value of the same beverage product stored for the same amount of time at 40° F., as measured by a spectrophotometer.

14. The beverage product of claim 10, wherein, after one week of storage at a temperature of up to 110° F. following manufacture, the beverage has an absorbance value at the optimal wavelength for the color derived from at least one natural source of no more than 25% less than the light measure value of the same beverage product stored for the same amount of time at 40° F., as measured by a spectrophotometer.

15. A method for inhibiting color fading of a beverage product exposed to thermal stress, comprising:
providing a beverage composition comprising at least one color derived from at least one natural source; and
adding to the beverage composition a compound selected from the group consisting of fumaric acid, maleic acid, maleic anhydride, cis-aconitic acid, trans-aconitic acid, mesaconic acid, and itaconic acid and combinations thereof, wherein the compound is present at a concentration of between about 30 ppm and about 1000 ppm.

16. The method of claim 15, wherein the compound is maleic anhydride and the maleic anhydride undergoes hydrolysis in the beverage product to form maleic acid.

17. The method of claim 15, wherein the beverage composition further comprises ascorbic acid.

18. The method of claim 15, wherein after one week of storage at a temperature of up to 110° F. following manufacture, the beverage has an absorbance value at the optimal wavelength for the color derived from at least one natural source of no more than 25% less than the light measure value of the same beverage product stored for the same amount of time at 40° F., as measured by a spectrophotometer.

\* \* \* \* \*